United States Patent
Bradin

(10) Patent No.: US 6,650,227 B1
(45) Date of Patent: Nov. 18, 2003

(54) READER FOR A RADIO FREQUENCY IDENTIFICATION SYSTEM HAVING AUTOMATIC TUNING CAPABILITY

(75) Inventor: John P. Bradin, Boulder, CO (US)

(73) Assignee: HID Corporation, Irvine, CA (US)

( * ) Notice: Subject to any disclaimer, the term of this patent is extended or adjusted under 35 U.S.C. 154(b) by 0 days.

(21) Appl. No.: 09/457,823

(22) Filed: Dec. 8, 1999

(51) Int. Cl.$^7$ ................................................ H04Q 5/22

(52) U.S. Cl. .................. 340/10.3; 340/10.1; 340/568.1; 340/572.1; 340/572.5; 340/825.72

(58) Field of Search ............................... 340/10.1, 10.3, 340/572.1, 825.72, 572.5, 568.1

(56) References Cited

U.S. PATENT DOCUMENTS

| | | | | |
|---|---|---|---|---|
| 4,730,188 A | * | 3/1988 | Milheiser | 340/825 |
| 5,936,527 A | * | 8/1999 | Isaacman et al. | 340/572.1 |
| 6,122,492 A | * | 9/2000 | Sears | 455/127 |

* cited by examiner

Primary Examiner—Julie Lieu
(74) Attorney, Agent, or Firm—Rodney F. Brown

(57) ABSTRACT

A reader for an RFID system has an exciter circuit for generating an excitation signal and a feedback circuit coupled to the exciter circuit for automatically tuning the exciter circuit. The exciter circuit has at least one retunable component providing the exciter circuit with adjustable component values and a plurality of signal generating states. The exciter circuit is initially tuned to a first signal generating state, but is retunable to additional signal generating states by adjusting the component value of the retunable component. The feedback circuit includes a circuit evaluator coupled to the exciter circuit for determining a value of an operational parameter of the exciter circuit. A decision-making circuit is coupled to the circuit evaluator for formulating a decision in response to the value of the operational parameter. An adjustment circuit is coupled to the decision-making circuit and exciter circuit for receiving the decision and conveying an adjustment instruction to the exciter circuit in response to the decision.

34 Claims, 2 Drawing Sheets

READER FOR A RADIO FREQUENCY IDENTIFICATION SYSTEM HAVING AUTOMATIC TUNING CAPABILITY

TECHNICAL FIELD

The present invention relates generally to radio frequency identification systems, particularly to the reader of a radio frequency identification system, and more particularly to a reader having a feedback circuit which enables the reader to automatically adjust to variations in the operating environment of the reader.

BACKGROUND OF THE INVENTION

Radio frequency identification (RFID) systems generally consist of a reader, also known as an interrogator, and a remote tag, also known as a transponder. The reader is termed an active device, while the tag is termed a passive device insofar as the tag lacks an internal power source, relying on the reader to remotely power its operation by inductive coupling. The RFID system is designed to provide communication between the reader and the remote tag in a wireless and contactless manner using radio frequency (RF) signals within a relatively narrow frequency range at a low or medium frequency, i.e., below about 30 MHz. Since the reader is active and the tag is passive, the reader must initiate all communications between the tag and the reader with the tag responding to the initiative of the reader.

Communication between the reader and tag is enabled by corresponding resonant LC pairs provided in the reader and tag which magnetically couple through the mutual inductance of the respective reader and tag inductors. The reader and tag inductors are coils which each function as transmitter and receiver antennas. An exemplary RFID system of the type described above is disclosed in U.S. Pat. No. 4,730,188 to Milheiser. Alternatively, the RFID system may have separate transmitter and receiver antennas in either the reader or the tag, or in both.

Communication between the reader and tag is initiated by the reader when the tag is proximally positioned relative to the reader. A current is conveyed to the reader LC pair causing the reader inductor to produce an excitation signal in the form of an electromagnetic field. The excitation signal couples to the proximally-positioned tag coil through mutual inductance and the excitation signal powers and clocks the tag circuitry initiating operation of the tag. Tag operation comprises generation of a response signal and transmission of the response signal from the tag back to the reader. In particular, a current is conveyed from the tag circuitry to the tag LC pair in response to the excitation signal causing the tag inductor to produce a response signal in the form of an electromagnetic field. The response signal couples to the reader inductor through mutual inductance in substantially the same manner as described above with respect to coupling of the excitation signal to the tag inductor. The tag typically employs frequency or amplitude modulation of the response signal to encode data stored in the memory of the tag circuitry into the response signal. When the response signal couples to the reader inductor, a corresponding current is induced in the reader inductor. The reader processes the induced current to read the data encoded in the response signal. The resulting data may be communicated to an output device, such as a display, printer, communication, or storage device, and simultaneously, or alternatively, communicated to a host computer, if a host computer is networked into the RFID system.

A common application for RFID systems of the type described above is security access control, wherein an authorized individual is provided with a tag typically mounted in a card. To gain access to a secured area, the authorized individual places the card near the reader enabling the reader to read identifying information stored in the memory of the tag and determine that the individual is authorized to enter the secured area. Another application for RFID systems is tracking living things or goods. A tag is applied to the object being tracked and a reader is placed at one or more locations where the object is known to pass. Movement of the object is recorded whenever the object passes a reader.

An important operational parameter of the reader is the range of the reader for communication with the tag, particularly when the reader is utilized in tracking applications. The range of the reader is inter alia strongly affected by the strength of the electromagnetic field generated by the reader LC pair. In order to generate a field strength which provides the reader with adequate range, the designer of the reader must properly specify a resonant circuit which is appropriately tuned for the desired application of the RFID system. An important design parameter for specifying the tuned resonant circuit is the quality factor, Q, which is simultaneously a measure of bandwidth and circuit efficiency. Circuit Q is usually limited by the maximum current the designer wishes to allow through the resonant circuit and the practical limitations of component values generally available for volume production. Another important design parameter for specifying the tuned resonant circuit is the resonant frequency, which is determined by the exact values of the components installed in the resonant circuit. In the event that modulation of the excitation signal is contemplated, additional constraints may be specified for the resonant circuit. A number of means exist to address these constraints, some of which, but not all, involve further limiting circuit Q.

In view of the above, the resonant circuit is generally designed by specifying the nominal resonant frequency of the circuit. Nominal inductive and capacitive components are determined which provide optimal performance for the desired application of the RFID system. The designer then determines the allowable circuit Q by calculating or measuring the effect of several factors, including the cost-effectiveness of specifying certain tolerances on components, drift of component values with time and temperature, nonlinearity of components (especially certain inductors) with operating voltages or currents, and the effect of metals or other electrically active materials in the immediate operating environment of the reader. For example, nearby metal in the operating environment of the reader may cause inductors of the type used in resonant circuits to change their effective inductance, thereby detuning the resonant circuit and reducing the range of the reader dramatically.

Accordingly, it is important that the design of the reader is robust in the sense that the anticipated influence of the above-recited factors does not unduly degrade the range of the reader. The usual design methodology to achieve robustness is to compromise circuit Q so that the resonant area of the resonant circuit is sufficiently broad. Unfortunately, this compromise results in decreased circuit efficiency, resulting in undesirable requirements such as higher power supply voltages and increased power consumption. This is especially undesirable in RFID systems powered by batteries, solar cells or other limited power sources. It also typically adds to the cost of the RFID system, even if power availability is not a significant limitation.

The present invention recognizes a need for a reader of an RFID system which is adaptable to a broad range of applications and their corresponding operating environments. Accordingly, it is an object of the present invention to provide an RFID system with a reader which performs effectively in a variety of applications. More particularly, it is an object of the present invention to provide an RFID system with a reader exhibiting satisfactory performance characteristics which adjust to variations in a given operating environment of the reader. It is another object of the present invention to provide a reader achieving a uniformly satisfactory level of performance when the reader is employed in different operating environments. It is another object of the present invention to provide a reader which automatically retunes itself to maintain a desired performance level in response to variations in a given operating environment or in response to relocating the reader to a different operating environment. These objects and others are accomplished in accordance with the invention described hereafter.

SUMMARY OF THE INVENTION

The present invention is a reader for an RFID system. The reader comprises an exciter circuit for generating an excitation signal and a feedback circuit coupled to the exciter circuit for automatically tuning the exciter circuit. The exciter circuit has at least one retunable component providing the exciter circuit with adjustable component values and a plurality of signal generating states. The retunable component may, for example, be a varactor, switched discrete capacitor, or an electrically adjustable inductor. The exciter circuit is initially tuned to a first signal generating state, but is retunable to additional signal generating states by adjusting the component value of the retunable component.

The feedback circuit includes a circuit evaluator coupled to the exciter circuit for determining a value of an operational parameter of the exciter circuit. The circuit evaluator may, for example, be a current detector or a voltage detector. A decision-making circuit is coupled to the circuit evaluator for formulating a decision in response to the value of the operational parameter. The decision-making circuit may, for example, be an analog device or a digital state machine. An adjustment circuit is coupled to the decision-making circuit and exciter circuit for receiving the decision and conveying an adjustment instruction to the exciter circuit in response to the decision.

The present invention is additionally a method for automatically tuning the exciter circuit of the reader to a specific operating environment by employing the feedback circuit described above. The method includes generating an excitation signal using the exciter circuit tuned to a first signal generating state. An operational parameter of the exciter circuit is evaluated at the first signal generating state by measuring a first value of the operational parameter. The operational parameter may, for example, be current or voltage in the exciter circuit. A second signal generating state for the exciter circuit is decided in response to the evaluation step by determining a second more optimal value of the operational parameter and comparing the first value to the second value. The exciter circuit is retuned to the second signal generating state in response to the decision step. The generation, evaluation and decision steps may be repeated at the second signal generating state and the exciter circuit is retuned to a third signal generating state in response to the decision.

The invention will be further understood from the drawings and the following detailed description.

DESCRIPTION OF PREFERRED EMBODIMENTS

Figure 1:
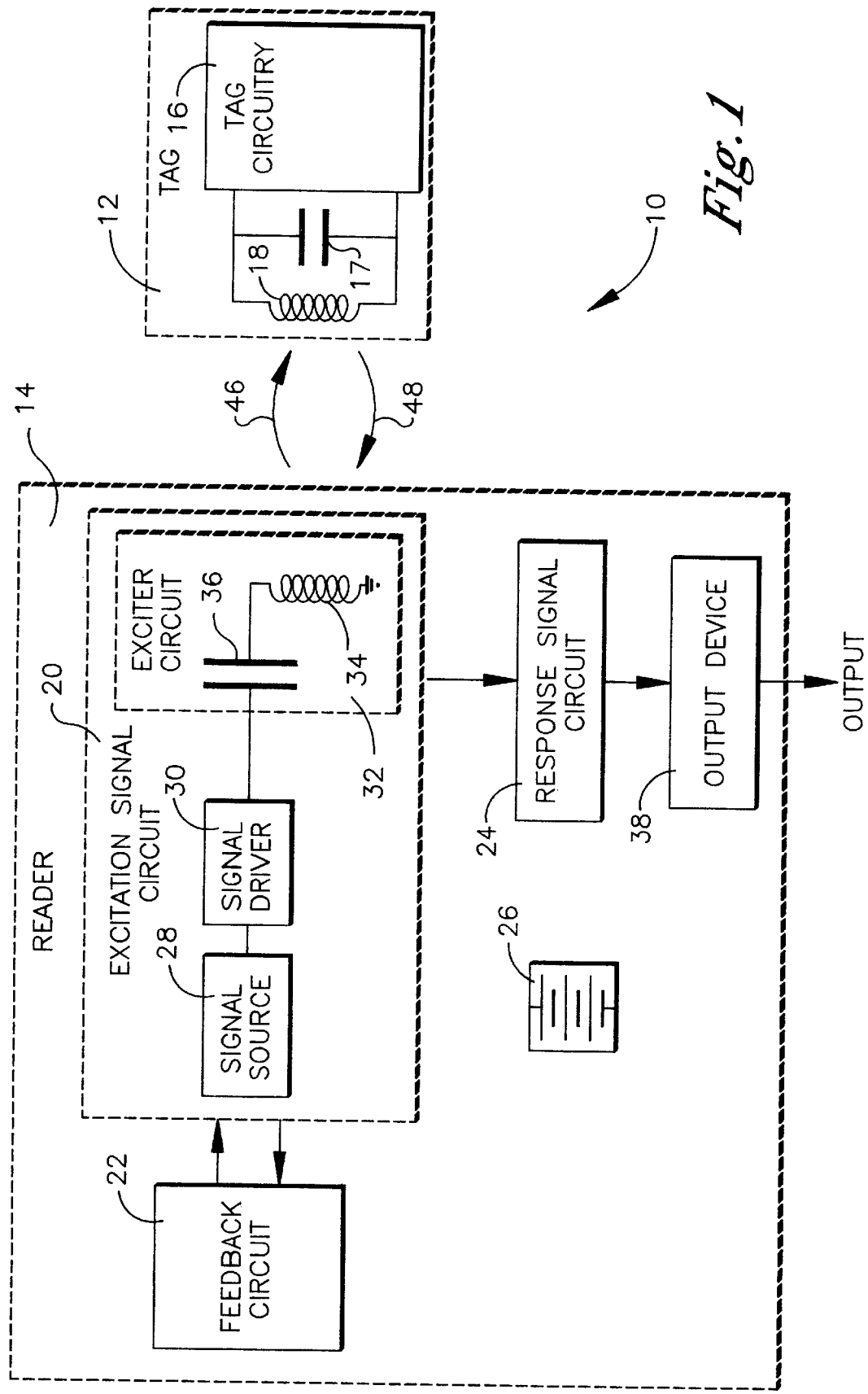
FIG. 1 is a block diagram of the circuitry of an RFID system including a reader of the present invention.

Referring to FIG. 1, a block diagram of the circuitry of an exemplary RFID system is shown and generally designated 10. The RFID system 10 comprises a tag 12 and a reader 14. The tag 12 is a conventional passive RFID tag, such as a tag having the circuitry disclosed in U.S. Pat. No. 4,730,188 to Milheiser, incorporated herein by reference. It is, nevertheless, understood that the present invention is not limited to a tag having any specific circuitry. The tag 12 generally comprises active tag circuitry 16 and a resonant LC pair 17, 18 having a predetermined resonant frequency. The LC pair comprises a capacitor 17 and a tag antenna 18, which is fabricated from a continuous length of electrically-conductive wire turned many times to form an induction coil. The tag antenna 18 can have both a transmitter and receiver function as shown here or can be separated into discrete transmitter and receiver antennas. The tag LC pair 17, 18 functions in association with a corresponding LC pair of the reader 14 described hereafter to provide wireless and contactless communication between the tag 12 and reader 14. The tag circuitry 16 includes an antenna interface, controller and memory (not shown), the structure and function of which are well known to the skilled artisan. Some or all of the above-recited elements of the tag circuitry 16 are often embodied in a single integrated circuit.

The circuitry of the reader 14 comprises a plurality of coupled circuits, generally including an excitation signal circuit 20, a feedback circuit 22, and a response signal circuit 24. The reader 14 also has a power source, which may be an internal power pack, such as a relatively small battery 26 consisting of one or more disposable dry cells or rechargeable cells as shown here. Alternatively the power source may be an external power supply (not shown), such as conventional household alternating current. The excitation signal circuit 20 includes an excitation signal source 28, an excitation signal driver 30, and an excitation signal output circuit 32 alternately termed an exciter circuit. The exciter circuit 32 is a resonant circuit including an LC pair. The inductor of the LC pair is a reader antenna 34 which is cooperatively shared with the response signal circuit 24. Like the tag antenna 18, the reader antenna 34 is fabricated from a continuous length of electrically-conductive wire which is turned many times to form an induction coil, usually substantially larger than that of the tag 12. The reader antenna 34 can have both a transmitter and receiver function as shown here or can alternatively be separated into a discrete transmitter antenna dedicated to the excitation signal circuit 20 and a discrete receiver antenna dedicated to the response signal circuit 24. The capacitor 36 of the LC pair is coupled in series, or alternatively in parallel, to the reader antenna 34. It is understood that the exciter circuit 32, being a resonant circuit, typically includes other circuit components not shown, the selection and configuration of which are within the purview of the skilled artisan. The exciter circuit 32 has a resonant frequency which may be tuned or adjusted by the feedback circuit 22 in a manner described below. It is noted that the terms "tune" and "adjust" are used synonymously herein with reference to the exciter circuit 32.

Although not specifically shown, it is appreciated by the skilled artisan that the response signal circuit 24 typically embodies response signal conditioner and demodulation components, the structure and function of which are well known to the skilled artisan. The reader 14 may also be provided with an output device 38, such as a visual, audible or mechanical output, which is coupled to the response signal circuit 24. The reader 14 may additionally, or in the alternative, be provided with connective wiring or a wireless means (not shown) coupled to the response signal circuit 24 or output device 36 which enables communication between the reader 14 and a remote host computer (not shown). Skilled artisans can further appreciate that the reader 14 can be provided with a writer circuit (not shown) capable of writing programming instructions or other information to the tag 12.

Specific elements of the feedback circuit 22 are described below with reference to FIG. 2, wherein elements which are substantially identical to those of FIG. 1 are designated by the same reference characters. The feedback circuit 22 comprises a circuit evaluator 40 coupled to the exciter circuit 32, a decision-making circuit 42 coupled to the circuit evaluator 40 and an adjustment circuit 44 coupled to the decision-making circuit 42 and to the exciter circuit 32. Further details of the feedback circuit 22 are described below in the context of a method for operating the RFID system 10.

Figure 2:
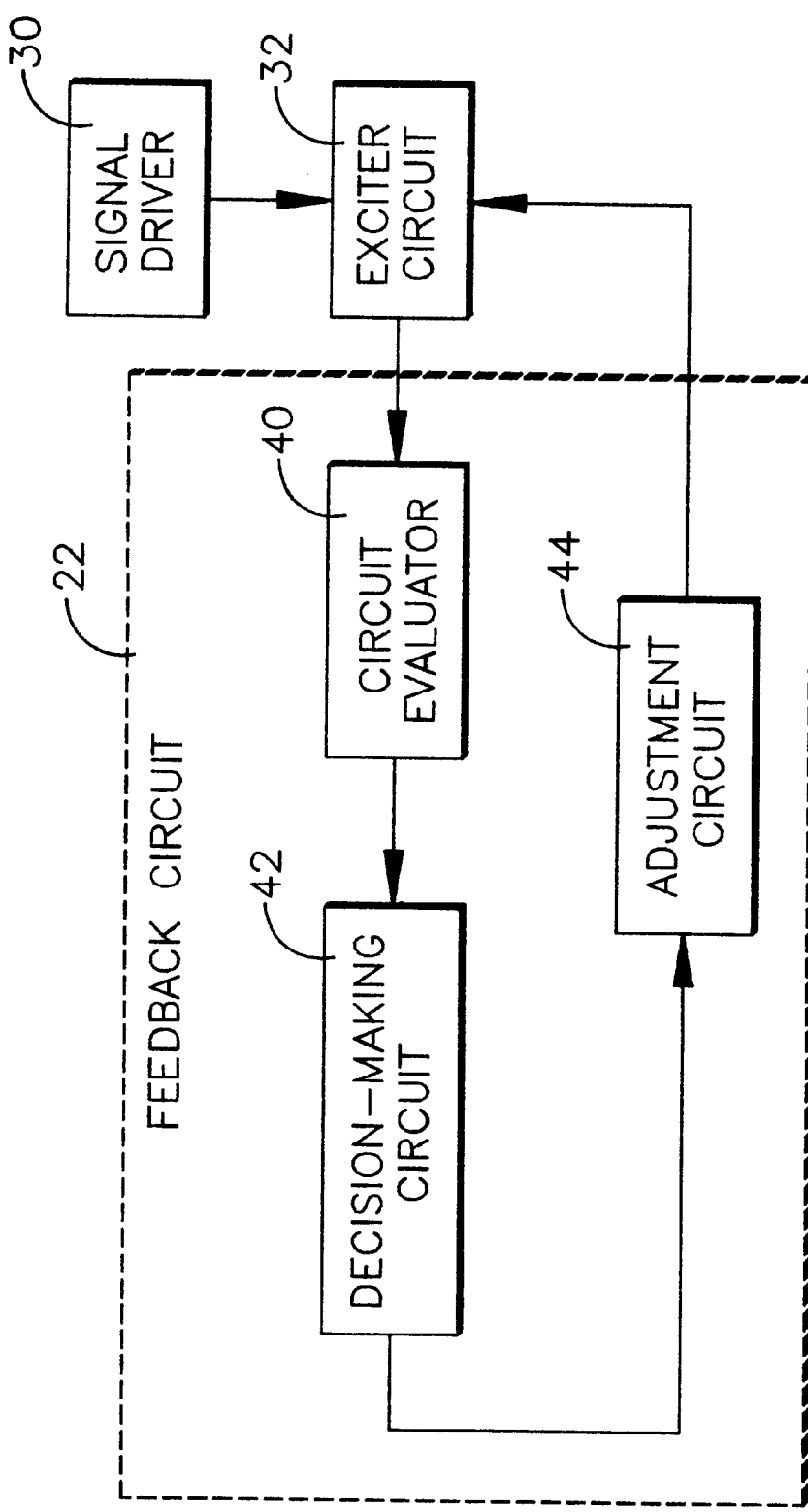
FIG. 2 is a more detailed block diagram of the feedback circuit included within the reader of FIG. 1.

Referring to FIGS. 1 and 2, a method of communication is provided using the RFID system 10. In accordance with this method, the reader 14 initiates communication with the tag 12 when the tag 12 is proximally positioned relative to the reader 14 by drawing electric power from the power source 26 to the signal source 28. The signal source 28 produces an ac signal, which is amplified by the signal driver 30 to supply a high voltage, high current signal to the exciter circuit 32. The LC pair 34, 36 of the exciter circuit 32 resonates in response to this high voltage, high current signal at its resonant frequency. The exciter circuit 32 is tuned to a given excitation signal generating state which enables the reader coil 34 of the LC pair to produce a desired excitation signal 46 in the form of a self-induced electromagnetic field and transmit the excitation signal 46 into the proximal environment surrounding the reader 14. When the excitation signal 46 contacts the tag coil 18, a current is mutually induced in the tag coil 18 which activates operation of the tag circuitry 16.

The tag circuitry 16, in cooperation with the tag LC pair 17, 18, operates in a conventional manner to generate and transmit a response signal 48 back to the reader 14. In particular, the tag 12 responds to the excitation signal from the reader 14 by powering and clocking the tag circuitry 16. The tag circuitry 16 conveys a current to the tag LC pair 17, 18 and the response signal 48 is produced by the tag coil 18 as the result of self-induction. The response signal 48 in the form of an electromagnetic field is transmitted from the tag coil 18 into the proximal environment surrounding the tag 12. The response signal 48 is typically frequency, amplitude or phase modulated, as is within the purview of the skilled artisan, to encode data stored in the tag memory into the response signal 48 for communication to the reader 14. When the response signal 48 contacts the reader coil 34, a current correlated to the response signal 48 is mutually induced in the reader coil 34. The current is conveyed to the response signal circuit 24 and processed in a conventional manner to read the data encoded in the response signal 48. The resulting data is communicated to the output device 38 or a host computer, if networked into the RFID system 10.

The present method employs the feedback circuit 22 of the invention in cooperation with the exciter circuit 32 to optimize performance of the reader 14 when the reader 14 is in the excitation mode of operation. As recited above, the excitation mode of operation comprises feeding an amplified high voltage, high current signal from the signal driver 30 to the exciter circuit 32 and resonating the LC pair 34, 36 of the exciter circuit 32 in response to the signal. It is noted that one or more component values of the exciter circuit 32 are selectively adjustable, enabling tuning of the exciter circuit 32 during operation of the RFID system 10 to alternate excitation signal generating states. The exciter circuit 32 is initially tuned to a first excitation signal generating state which may be an approximated optimal state for the anticipated application and operating environment of the reader 14. The self-induced electromagnetic field formed at the reader coil 34 is transmitted as a first excitation signal into the proximal environment surrounding the reader 14.

The circuit evaluator 40 of the feedback circuit 22 is coupled to the exciter circuit 32 and determines a first value of a predetermined operational parameter of the exciter circuit 32 while in the first excitation signal generating state. For example, the predetermined operational parameter may be the current at the reader coil 34 and the circuit evaluator 40 is correspondingly a current detector which measures the value of the current. Exemplary means for measuring current include a series resistor or an inductor coupled to the exciter circuit 32. Alternatively, the predetermined operational parameter may be the voltage across the exciter circuit 32 and the circuit evaluator 40 is correspondingly a voltage detector which measures the value of the voltage using a detection method such as peak tuning capacitor voltage detection. In any case, the circuit evaluator 32 is coupled to the decision-making circuit 42 to communicate the first value of the operational parameter to the decision-making circuit 42. The decision-making circuit 42 is capable of determining the practical limits for a second value of the predetermined operational parameter based on the first value, wherein the second value enables the exciter circuit 32 to more closely approach optimal performance. As such, the decision-making circuit 42 may be an analog device or a digital state machine, including a microcontroller. The decision-making circuit 42 is coupled to the adjustment circuit 44 to communicate the second value of the predetermined operational parameter to the adjustment circuit 44. The adjustment circuit 44, which is coupled to the exciter circuit 32, retunes the exciter circuit 32 to a second more optimal signal generating state by changing one or more effective component values of the exciter circuit 32. For example, the adjustment circuit 44 may adjust the component values of a varactor, a switched discrete capacitor or an electrically adjustable inductor to retune the exciter circuit 32 and achieve the second value of the predetermined operational parameter. The tuning cycle is completed when the second value of the operational parameter is achieved in the exciter circuit 32. The feedback circuit 22 may perform additional tuning cycles continuously or intermittently in correspondence with operation of the exciter circuit 32 to achieve optimal performance of the exciter circuit 32 in an iterative manner.

The elements of the feedback circuit 22 are described above by way of example. It is understood, however, that the invention is not limited to the present exemplary embodiments of these elements. The invention further encompasses other embodiments of these elements which are within the purview of the skilled artisan employing the teaching of the prior art in combination with the teaching of the invention.

The automatic tuning capability of the feedback circuit 22, which enables self-adjustment of the reader 14, is particularly advantageous in applications where it is difficult or inconvenient to access the reader 14. Use of the feedback circuit 22 is also advantageous in applications where the operating environment of the RFID system 10 is subject to frequent variability or even where fixed levels of disruptive elements are present in the operating environment. Thus, the present invention has specific utility to applications where the operating environment of the RFID system 10 includes metal-containing elements, either at a fixed or variable level. The present invention also has utility to applications where the RFID system 10 is relatively inaccessible, such as long range passive systems submerged in water to track fish populations. The present invention continuously maintains a satisfactory operating range for the RFID system without requiring operator intervention.

While the forgoing preferred embodiments of the invention have been described and shown, it is understood that alternatives and modifications, such as those suggested and others, may be made thereto and fall within the scope of the invention.

I claim:

1. A reader for a radio frequency identification system comprising:
    a resonant circuit including an LC pair for outputting an excitation signal;
    a current detector coupled to said resonant circuit for determining a value of an operational parameter of said resonant circuit;
    a decision-making circuit coupled to said current detector for formulating a decision in response to the value of the operational parameter; and
    an adjustment circuit coupled to said decision-making circuit and to said resonant circuit for receiving the decision and conveying an adjustment instruction to said resonant circuit in response to the decision, thereby modifying the excitation signal output by said resonant circuit in response to the adjustment instruction.

2. The reader of claim 1 wherein said resonant circuit includes a retunable component.

3. The reader of claim 2 wherein the excitation signal is output by said resonant circuit at a first signal generating state and the excitation signal is modified to a second signal generating state in response to the adjustment instruction by retuning said retunable component.

4. The reader of claim 2 wherein said retunable component is an electrically adjustable inductor.

5. The reader of claim 2 wherein said retunable component is a switched discrete capacitor.

6. The reader of claim 1 wherein said decision-making circuit is an analog device.

7. The reader of claim 1 wherein said decision-making circuit is a digital state machine.

8. A reader for a radio frequency identification system comprising:
    a resonant circuit including an LC pair for outputting an excitation signal;
    a voltage detector coupled to said resonant circuit for determining a value of an operational parameter of said resonant circuit;
    a decision-making circuit coupled to said voltage detector for formulating a decision in response to the value of the operational parameter; and
    an adjustment circuit coupled to said decision-making circuit and to said resonant circuit for receiving the decision and conveying an adjustment instruction to said resonant circuit in response to the decision, thereby modifying the excitation signal output by said resonant circuit in response to the adjustment instruction.

9. The reader of claim 8 wherein said resonant circuit includes a retunable component.

10. The reader of claim 9 wherein said retunable component is an electrically adjustable inductor.

11. The reader of claim 9 wherein said retunable component is a switched discrete capacitor.

12. The reader of claim 9 wherein the excitation signal is output by said resonant circuit at a first signal generating state and the excitation signal is modified to a second signal generating state in response to the adjustment instruction by retuning said retunable component.

13. The reader of claim 8 wherein said decision-making circuit is an analog device.

14. The reader of claim 8 wherein said decision-making circuit is a digital state machine.

15. A reader for a radio frequency identification system comprising:
    a resonant circuit including an LC pair for outputting an excitation signal;
    a varactor coupled to said resonant circuit for determining a value of an operational parameter of said resonant circuit;
    a decision-making circuit coupled to said varactor for formulating a decision in response to the value of the operational parameter; and
    an adjustment circuit coupled to said decision-making circuit and to said resonant circuit for receiving the decision and conveying an adjustment instruction to said resonant circuit in response to the decision, thereby modifying the excitation signal output by said resonant circuit in response to the adjustment instruction.

16. A method for tuning a reader of a radio frequency identification system to a specific operating environment comprising:
    outputting an excitation signal from a resonant circuit local to said reader and including an LC pair tuned to a first signal generating state;
    evaluating a current of said resonant circuit at said first signal generating state;
    deciding a second signal generating state for said resonant circuit in response to said evaluation step; and
    retuning said resonant circuit to said second signal generating state in response to said deciding step to modify said excitation signal.

17. The method of claim 16 wherein said evaluation step includes measuring a first value of said current.

18. The method of claim 17 further comprising determining a second value of said current and performing said deciding step by comparing said first value to said second value.

19. The method of claim 16 further comprising repeating said outputting, evaluating, and deciding steps at said second signal generating state and retuning said resonant circuit to a third signal generating state in response to said deciding step.

20. The method of claim 16 further comprising performing said outputting, evaluating, deciding, and retuning steps local to said reader.

21. A method for tuning a reader of a radio frequency identification system to a specific operating environment comprising:

outputting an excitation signal from a resonant circuit local to said reader and including an LC pair tuned to a first signal generating state;

evaluating a voltage of said resonant circuit at said first signal generating state;

deciding a second signal generating state for said resonant circuit in response to said evaluation step; and retuning said resonant circuit to said second signal generating state in response to said deciding step to modify said excitation signal.

22. The method of claim 21 wherein said evaluation step includes measuring a first value of said voltage.

23. The method of claim 22 further comprising determining a second value of said voltage and performing said deciding step by comparing said first value to said second value.

24. The method of claim 21 further comprising repeating said outputting, evaluating, and deciding steps at said second signal generating state and retuning said resonant circuit to a third signal generating state in response to said deciding step.

25. The method of claim 21 further comprising performing said outputting, evaluating, deciding, and retuning steps local to said reader.

26. A reader for a radio frequency identification system comprising:

a resonant circuit including an LC pair local to said reader and tuned to a first signal generating state for outputting an excitation signal;

means local to said reader for evaluating a voltage of said resonant circuit; and means local to said reader for deciding a second signal generating state for said resonant circuit in response to said evaluation means; and means local to said reader for retuning said resonant circuit to said second signal generating state, thereby modifying said excitation signal.

27. A reader for a radio frequency identification system comprising:

an exciter circuit for generating an excitation signal;

a current detector coupled to said exciter circuit for determining a value of an operational parameter of said exciter circuit;

a decision-making circuit coupled to said circuit evaluator for formulating a decision in response to the value of the operational parameter; and an adjustment circuit coupled to said decision-making circuit and to said exciter circuit for receiving the decision and for conveying an adjustment instruction to said exciter circuit in response to the decision.

28. A reader for a radio frequency identification system comprising:

an exciter circuit for generating an excitation signal;

a voltage detector coupled to said exciter circuit for determining a value of an operational parameter of said exciter circuit;

a decision-making circuit coupled to said circuit evaluator for formulating a decision in response to the value of the operational parameter; and an adjustment circuit coupled to said decision-making circuit and to said exciter circuit for receiving the decision and for conveying an adjustment instruction to said exciter circuit in response to the decision.

29. A reader for a radio frequency identification system comprising:

an exciter circuit for generating an excitation signal;

a varactor coupled to said exciter circuit for determining a value of an operational parameter of said exciter circuit;

a decision-making circuit coupled to said circuit evaluator for formulating a decision in response to the value of the operational parameter; and an adjustment circuit coupled to said decision-making circuit and to said exciter circuit for receiving the decision and for conveying an adjustment instruction to said exciter circuit in response to the decision.

30. A method for tuning a reader of a radio frequency identification system to a specific operating environment comprising:

generating an excitation signal with an exciter circuit tuned to a first signal generating state;

evaluating a current of said exciter circuit at said first signal generating state; and deciding a second signal generating state for said exciter circuit in response to said evaluation step.

31. A method for tuning a reader of a radio frequency identification system to a specific operating environment comprising:

generating an excitation signal with an exciter circuit tuned to a first signal generating state;

evaluating a voltage of said exciter circuit at said first signal generating state; and deciding a second signal generating state for said exciter circuit in response to said evaluation step.

32. A reader for a radio frequency identification system comprising:

means for generating an excitation signal, wherein said generating means is tuned to a first signal generating state;

means for evaluating a current of said generating means; and means for deciding a second signal generating state for said generating means in response to said evaluation means.

33. A reader for a radio frequency identification system comprising:

means for generating an excitation signal, wherein said generating means is tuned to a first signal generating state;

means for evaluating a voltage of said generating means; and means for deciding a second signal generating state for said generating means in response to said evaluation means.

34. A reader for a radio frequency identification system comprising:

a resonant circuit including an LC pair local to said reader and tuned to a first signal generating state for outputting an excitation signal;

means local to said reader for evaluating a current of said resonant circuit; and means local to said reader for deciding a second signal generating state for said resonant circuit in response to said evaluation means; and means local to said reader for retuning said resonant circuit to said second signal generating state, thereby modifying said excitation signal.

* * * * *